US012626405B2

(12) United States Patent
Díaz Lankenau et al.

(10) Patent No.: US 12,626,405 B2
(45) Date of Patent: May 12, 2026

(54) CAMERA CALIBRATION OF A TELEPRESENCE SYSTEM

(71) Applicant: Google LLC, Mountain View, CA (US)

(72) Inventors: Guillermo Fabian Díaz Lankenau, Santa Cruz, CA (US); Alejandro Jose Troccoli, San Jose, CA (US); Antonio Yamil Layon Halun, Mountain View, CA (US)

(73) Assignee: Google LLC, Mountain View, CA (US)

( * ) Notice: Subject to any disclaimer, the term of this patent is extended or adjusted under 35 U.S.C. 154(b) by 431 days.

(21) Appl. No.: 18/305,677

(22) Filed: Apr. 24, 2023

(65) Prior Publication Data

US 2024/0354990 A1 Oct. 24, 2024

(51) Int. Cl.
*G06T 7/80* (2017.01)
*H04N 17/00* (2006.01)
*H04N 23/90* (2023.01)

(52) U.S. Cl.
CPC ............. *G06T 7/80* (2017.01); *H04N 17/002* (2013.01); *H04N 23/90* (2023.01); *G06T 2207/30204* (2013.01); *G06T 2207/30244* (2013.01)

(58) Field of Classification Search
CPC ......... G06T 7/80; H04N 23/90; H04N 17/002
See application file for complete search history.

(56) References Cited

U.S. PATENT DOCUMENTS

| | | | |
|---|---|---|---|
| 10,839,557 B1 | 11/2020 | Arora et al. | |
| 11,277,574 B1 | 3/2022 | Perkins | |
| 11,528,451 B2 * | 12/2022 | Haaland | G06T 17/20 |
| 11,694,363 B2 * | 7/2023 | Stopp | A61B 34/20 |
| | | | 348/77 |
| 2009/0058987 A1 * | 3/2009 | Thielman | H04N 7/142 |
| | | | 348/E7.083 |
| 2015/0288951 A1 * | 10/2015 | Mallet | G06T 7/80 |
| | | | 348/46 |
| 2015/0381902 A1 * | 12/2015 | Bao | H04N 5/2624 |
| | | | 348/14.07 |

(Continued)

FOREIGN PATENT DOCUMENTS

WO 2004012141 A2 2/2004

OTHER PUBLICATIONS

Francken, et al., "Screen-Camera Calibration Using a Spherical Mirror", IEEE Xplore, Jun. 2007, 7 pages.

(Continued)

*Primary Examiner* — Olisa Anwah
(74) *Attorney, Agent, or Firm* — Brake Hughes Bellermann LLP

(57) ABSTRACT

A telepresence system may include a display configured to present three-dimensional images. The 3D images may be rendered from multiple images captured by multiple cameras that image an area from different viewpoints. Misalignment of any of the multiple cameras may negatively affect the rendering. Accordingly, the telepresence system may calibrate the cameras to compensate for any misalignment as part of the rending. This calibration may include capturing an image, or images, of a calibration target to determine the relative positions of the cameras. The disclosed telepresence system can perform this calibration online and using targets in fixed locations that are not easily noticeable to a user

19 Claims, 7 Drawing Sheets

(56)        References Cited

U.S. PATENT DOCUMENTS

| | | | | |
|---|---|---|---|---|
| 2016/0094840 A1* | 3/2016 | Warner | .................... | G06T 7/80 |
| | | | | 348/188 |
| 2017/0287166 A1* | 10/2017 | Claveau | .................... | G06T 7/80 |
| 2020/0320796 A1 | 10/2020 | Estable | | |
| 2021/0021748 A1* | 1/2021 | Cutler | .................... | H04N 5/208 |
| 2021/0367985 A1* | 11/2021 | Bansal | ................ | H04L 65/403 |
| 2024/0193815 A1* | 6/2024 | Ulusoy | ................ | H04N 23/90 |
| 2024/0233180 A1* | 7/2024 | Platonov | ................ | G06T 7/246 |
| 2024/0338851 A1* | 10/2024 | Perreault | .................... | G06T 7/80 |

OTHER PUBLICATIONS

Fu, et al., "A Mirror-Based Fast Camera-Screen Calibration Method", https://www.researchgate.net/publication/289649597_A_mirror-based_fast_camera-screen_calibration_method, Dec. 2013, 5 pages.
Takahashi, et al., "A New Mirror-Based Extrinsic Camera Calibration Using an Orthogonality Constraint", IEEE, https://ieeexplore.ieee.org/document/6247783, 2012, pp. 1051-1058.

* cited by examiner

400

410

450

CAMERA CALIBRATION OF A TELEPRESENCE SYSTEM

FIELD OF THE DISCLOSURE

The present disclosure relates to a system and method for measuring relative positions of the cameras in a telepresence system using targets installed in the environment of a user.

BACKGROUND

A telepresence conferencing system (i.e., telepresence system) can be used for audio/video communication between people. Some telepresence systems use a variety of techniques to enhance the realism of this communication in order to make a user feel like they are speaking in-person with another user. One technology used for this realism is the display. The display used in a telepresence system can be sized and positioned so that the user can view the person at an expected size (i.e., life-sized). Additionally, the display may be configured to display images that appear to be three-dimensional (3D). These 3D displays can require multiple images captured by a set of cameras configured to image a subject from multiple perspectives (i.e., multiple viewpoints).

SUMMARY

For high quality 3D video reproduction, it is necessary to know the relative positions of cameras in a camera array (i.e., set of cameras). A calibration process can be used to determine these relative positions but may require a specialized, obtrusive process that is performed infrequently (e.g., once or twice a year). Disclosed herein is a calibration process that can be performed online and that does not require any specialized equipment or user participation. Further, a user may not notice the process occurring because targets for the calibration may be positioned or designed to obscure their use from the user.

In some aspects, the techniques described herein relate to a telepresence system including: a local display configured to present three-dimensional images to a local user in a local viewing-area; a local set of cameras positioned relative to each other to capture images of the local viewing-area from multiple perspectives; an accessory positioned in the local viewing-area; a target disposed on a surface of the accessory that faces the local set of cameras and that faces away from the local user so that the accessory blocks the local user from viewing the target; and a local processor communicatively coupled to the local display and the local set of cameras, the local processor configured by software instructions to perform a calibration process that includes: capturing images of the target from at least two cameras of the local set of cameras.

In some aspects, the techniques described herein relate to a method for calibrating cameras of a telepresence system, the method including: capturing images of a set of targets using a local set of cameras mounted in a frame of a local display, each target of the set of targets at fixed locations in a local viewing-area; identifying a first set of images captured by at least two cameras that include a first target of the set of targets; determine a first set of relative positions of the at least two cameras based on the first target in the first set of images; identifying a second set of images captured by at least two cameras that include a second target of the set of targets; determine a second set of relative positions of the at least two cameras based on the second target in the second set of images; and generating, or updating, a calibration for the local set of cameras based on the first set of relative positions and the second set of relative positions, the calibration corresponding to misalignments of the local set of cameras from a set of target alignments.

In some aspects, the techniques described herein relate to a telepresence system including: a local viewing-area including: a local set of cameras positioned relative to each other to capture images of the local viewing-area from multiple perspectives; a target fixedly disposed on a surface of the local viewing-area; and a local processor communicatively coupled to the local set of cameras, the local processor configured by local software instructions to perform a calibration process that includes: capturing images of the target from at least two cameras of the local set of cameras; determining based on the images of the target, relative positions between the at least two cameras; and generating, or updating, a calibration file based on the relative positions; and a remote viewing-area including: a remote display configured to present three-dimensional images; and a remote processor communicatively coupled to the local processor and the remote display, the remote processor configured by remote software instructions to perform a three-dimension image rendering process that includes: receiving images captured by the local set of cameras and the calibration file generated by the local processor; generating adjusted images based on the calibration file, the adjusted images including corrected perspectives of the local viewing-area that compensate for misalignments of the local set of cameras; and combining the adjusted images for display as the three-dimensional images on the remote display.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
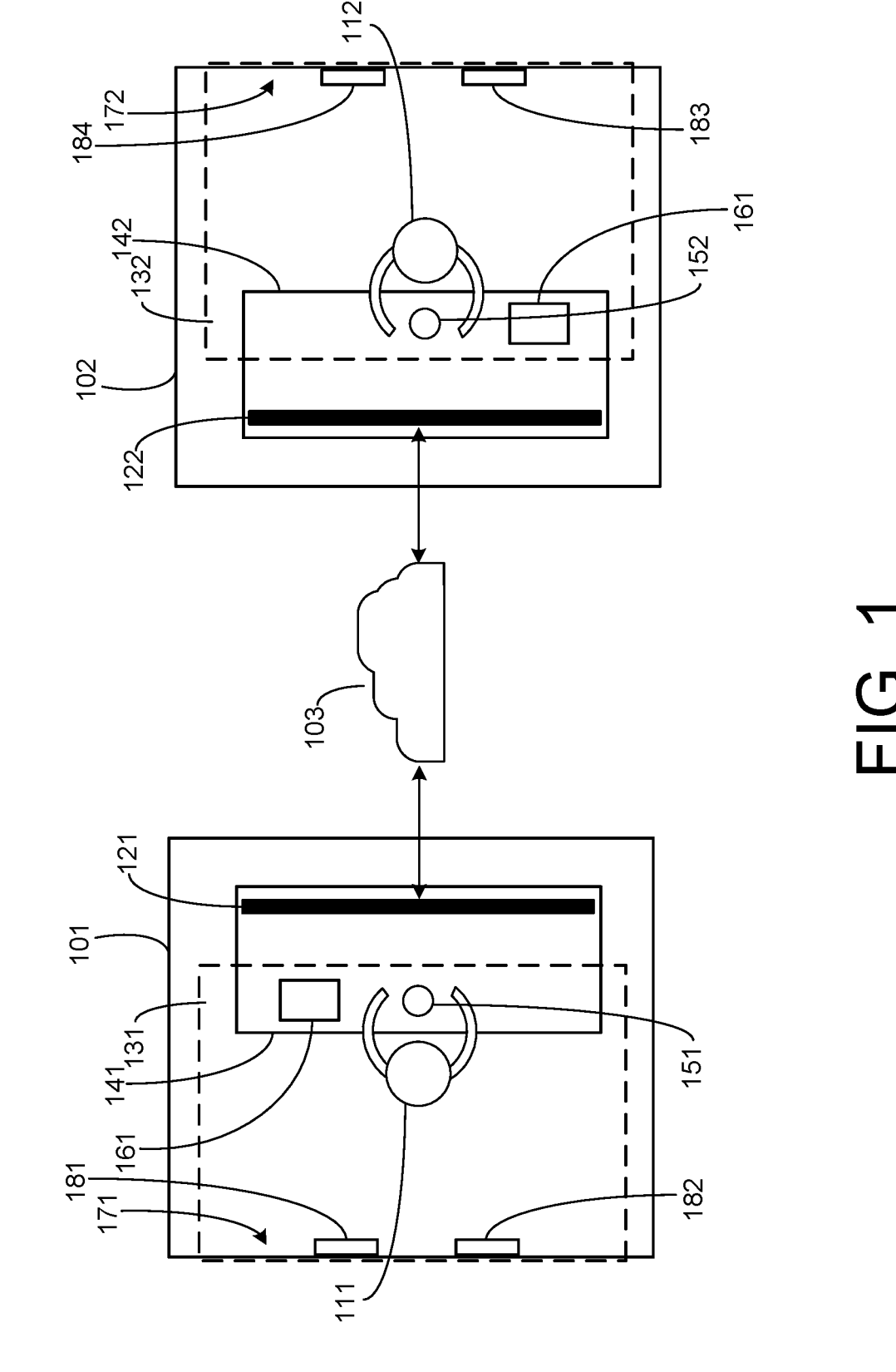
FIG. 1 illustrates a telepresence system 100 according to a possible implementation of the present disclosure.

While traditional video conferencing through a computer (e.g., laptop) can provide an experience that is closer to a face-to-face meeting than a teleconference through a phone, it may have aspects that lack realism. For example, a user may see a small version of a person on their screen; the person on their screen may not appear to engage in eye-contact because their camera may be misaligned with their screen; and the person on their screen may have no apparent depth. To improve realism, systems have been created to present video of the person in three dimensions (3D) using virtual reality technology. A drawback with this approach however is that it can require the user to wear head-mounted displays, goggles, or 3D glasses, thereby negatively affecting the sense of realism.

Telepresence is a subset of videoconferencing, which provides an improved sense of realism to a user without requiring the user to necessarily wear any equipment. Instead, the user may simply sit in front of a display to observe a life-sized, high resolution, and three-dimensional (3D) video (i.e., images) of the person with whom they are communicating.

The display in a telepresence system may be configured to display 3D images based on a stereoscopic technique that does not require a user (i.e., viewer) to wear glasses (i.e., autostereoscopic). Instead, the display may project images spatially so that a user viewing the display may receive a first image of a stereoscopic pair at a left eye and a second image of the stereoscopic pair at the right eye. For example, the first image may be captured by a first camera pointed in a first direction at a scene and the second image may be captured by a second camera pointed in a second direction at the scene. The first direction and the second direction may provide the different perspectives necessary for the user to perceive the scene in 3D, and misalignments of either camera can negatively affect the 3D effect. While two cameras have been described for the purpose of explanation, an actual telepresence system may include more than two cameras (e.g., six), which can make the alignment requirements even more precise.

A technical problem facing telepresence systems is maintaining the alignment of the cameras so that the 3D effect is not negatively affected. For example, a change of less than a tenth of a degree may be enough to change a 3D image of the display. Mechanically maintaining this tolerance may be practically difficult. For example, temperature changes over a range of expected temperatures may alter the camera alignment enough to negatively affect the 3D experience. Further, a shock or continued stress to the telepresence system may alter the camera alignment enough to negatively affect the 3D experience. As a result, a calibration process may be used (e.g., periodically) to determine the position (i.e., perspective, pose) of each camera instead of maintaining a precise (e.g., factory-set) alignment.

The calibration process may include positioning a calibration target (i.e., target) in view of the cameras of the telepresence system, capturing an image of the target from the perspective of each camera, and then analyzing the targets in the respective images to determine the relative positions of the cameras. For example, a position (i.e., orientation) difference between two cameras may be determined based on where features (i.e., patterns, shapes, colors, etc.) of the target are located in each of the images captured by the two cameras. For implementations in which the target cannot be viewed by all cameras simultaneously, the target may be moved in view of the cameras for imaging (i.e., sequentially) so that the relative locations can be computed. Alternatively, multiple targets, each viewable to overlapping sets of cameras, may be imaged and analyzed to compute the relative locations.

A technical problem facing the calibration process described above is that it can require participation by a user.

For example, the user may be required to position and/or move the target so that the images can be captured for analysis. In other words, the calibration process may not be automatic but rather rely on accurate and timely user participation, which may not be reliable and/or timely.

Another technical problem facing the calibration process described above is that the telepresence system is not usable while it is being calibrated. In other words, the calibration process described above is performed offline (i.e., offline calibration process). The disclosed telepresence system addresses this technical problem by performing the calibration while the telepresence system is in use, or otherwise available for use (i.e., online calibration).

Performing an online calibration process may include capturing images of the target while the system is being used (or is otherwise usable). An online calibration process may occur without input from a user (i.e., automatically) and a user may not notice that the calibration process is running. Accordingly, the online calibration process may require a target or targets to be permanently placed in view of the cameras. This may introduce the problem of the permanently installed targets being obtrusive, distracting, and/or otherwise not esthetically pleasing. The disclosed telepresence system addresses this technical problem by using one or more targets that are obscured from casual view and/or otherwise made esthetically pleasing and/or unobtrusive to blend in with an environment, thereby hiding their use and/or purpose, which facilitates their permanent installation.

FIG. 1 illustrates a telepresence system 100 according to a possible implementation of the present disclosure. The telepresence system may include a plurality of stations that can be communicatively coupled together via a network 103 (e.g., internet). The stations may be identified based on their relationship to a user. For example, a local user uses a local station to communicate with a remote user at a remote station. The terms local and remote are therefore relative and may be used interchangeably, depending on a frame of reference.

As mentioned, a local station 101 at a first location may be used by a local user 111 to communicate with a remote user 112 using a remote station 102 in a different area. The local user 111 may view images (i.e., 3D images) of the remote user 112 on a local display 121, while the remote user 112 may view images (i.e., 3D images) of the local user 111 on the remote display 122. For this the local station 101 may include a local set of cameras configured to capture images of a local viewing-area 131 and the remote station 102 may include a remote set of cameras configured to capture images of a remote viewing-area 132.

In a possible implementation, the local station 101 and the remote station 102 are each a room customized for telepresence communication. Accordingly, the rooms can include the equipment (e.g., accessories) for the user to use while communicating (i.e., while online). The room and equipment may be designed to have a prescribed layout so that the local station 101 and remote station 102 are identical versions of each other. For example, the rooms may have similar (e.g., the same) dimensions; similar (e.g., the same) looks (e.g., wall coverings, layout, etc.); and similar (e.g., the same) equipment (e.g., furniture, electronics, etc.). For example, the local station 101 and the remote station 102 may each have versions of the same desk for a user to sit at while the user communicates. Accordingly, the local user 111 sitting at a local desk 141 and the remote user 112 sitting at a remote desk 142 may occupy similar (e.g., the same) positions within their respective viewing area.

The stations may include accessories that are fixedly positioned within the room (e.g., within the viewing area). For example, the accessories can be at (respective) fixed locations in each viewing area. In a possible implementation, the accessories of the local station 101 may include a local microphone 151. The local microphone 151 may be fastened to a surface of the local desk 141. Likewise, the remote station 102 may include a remote microphone 152, which may be fastened to a surface of the remote desk 142.

In a possible implementation, the accessories of the local station 101 may further include a local equipment-mount 161 (e.g., tablet stand). The local equipment-mount may be fastened to a surface (e.g., top surface) of the local desk 141. Likewise, the remote station 102 may include a remote equipment-mount (e.g., tablet stand), which may be fastened to a surface of the remote desk 142.

Other accessories may be included and may be affixed or otherwise fastened to a surface in the viewing area. In a possible implementation, each station can include a speaker or speakers. As shown, the local station 101 may include a local (left) speaker 181 and a local (right) speaker 182, which can be fastened to a wall (or walls) of the local station 101. As shown the local (left) speaker 181 and the local (right) speaker 182 are mounted to a local wall 171 (i.e., back wall) behind the local user 111 in the local viewing-area 131. Likewise, the remote station 102 may include a remote (left) speaker 183 and a remote (right) speaker 182, which can be fastened to a wall (or walls) of the remote station 102. As shown, the remote (left) speaker 183 and the remote (right) speaker 184 are mounted to a remote wall 172 (i.e., back wall) behind the remote user 112 in the remote viewing-area 132.

Targets for calibration may be placed within each viewing area. At the local station 101, for example, a target may be disposed (e.g., affixed, etched, marked, etc.) on the local desk 141, the local equipment-mount 161, the local microphone 151, the local (left) speaker 181, the local (right) speaker 182, and/or the local wall 171.

The telepresence system 100 shown in FIG. 1 is one possible example. It should be understood that implementations in which the details shown are omitted or rearranged are still within the scope of the disclosure. Further some details (e.g., accessories, targets) may be added, moved, rearranged, or removed from what is described while still being within the intended scope of the disclosure.

Figure 2:
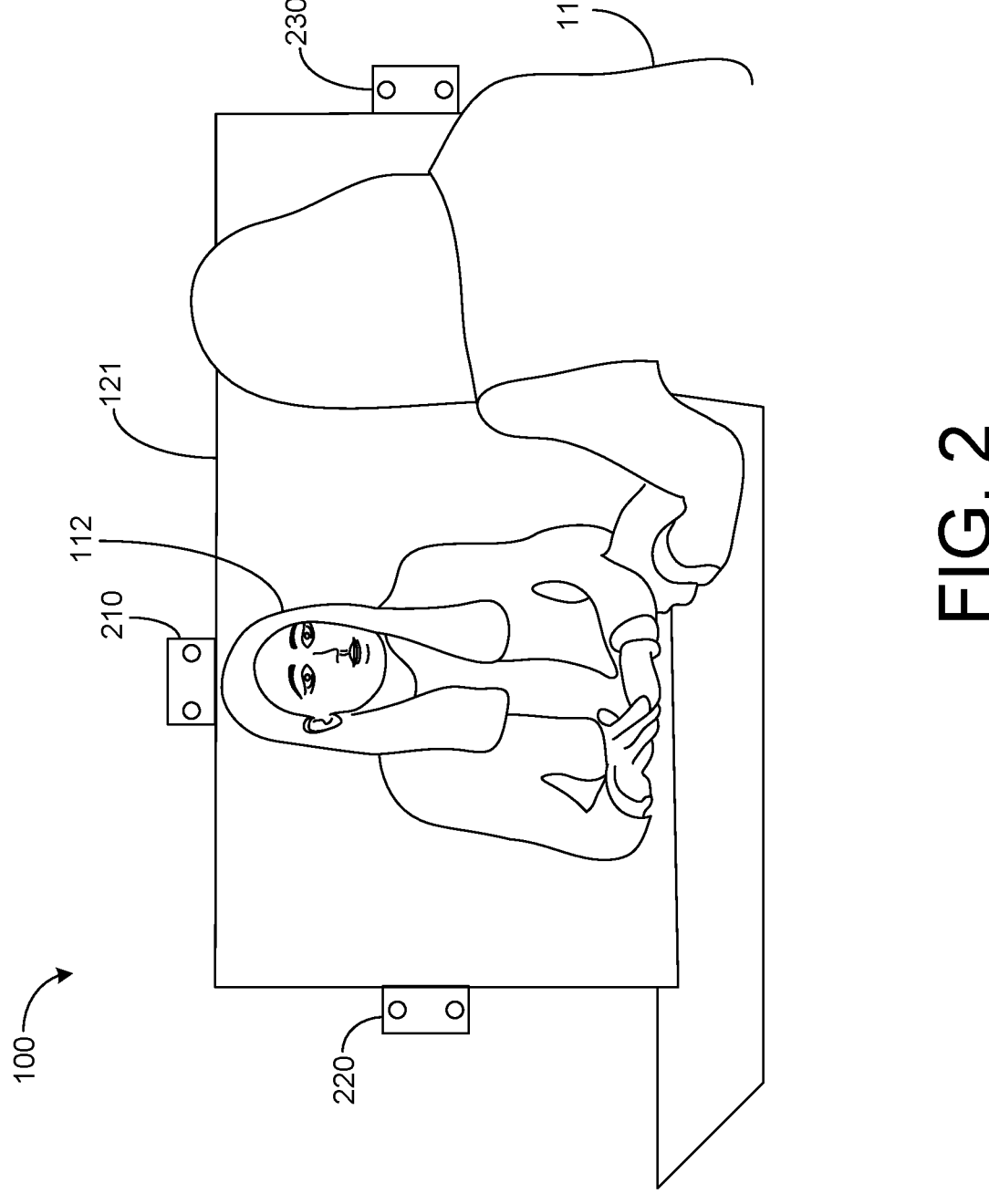
FIG. 2 is a perspective view of a local user interacting with a telepresence system to communicate with a remote user according to an implementation of the present disclosure.

FIG. 2 is a perspective view of a local user interacting with a telepresence system to communicate with a remote user according to an implementation of the present disclosure. As shown, a local user 111 is facing a local display 121 to view an image of a remote user 112, which is rendered in 3D. This rendering may include combining images from a set of cameras position relative to each other to capture images of a viewing-area from multiple perspectives. As such, a set of cameras may be included at each station to capture images of a viewing area in which a user is positioned. The set of cameras may be integrated with the display. For example, cameras may be integrated in a frame that surrounds the display.

As shown in FIG. 2, the local display 121 can include a local set of cameras directed towards the local user 111, which includes a first subset 210 of cameras positioned in a top portion of the frame of the local display 121, a second subset 220 of cameras positioned in a left portion of the frame, and a third subset 230 of cameras is positioned in a right portion of the frame. For the example shown, each subset includes two cameras, but other camera configurations are possible and within the scope of the present invention.

Each camera may capture an image of the user in the viewing-area from a different perspective (i.e., point-of-view, field-of-view). The different perspective images can be rendered into a 3D image based on the positions (i.e., alignments) of the cameras. The positions of the cameras may be relative. For example, in a three-camera system (i.e., cam1, cam2, cam3) the position may be described as (i) the position of cam2 relative to cam1, (ii) the position of cam 3 relative to cam1, (iii) the position of cam 1 relative to cam2, (iv) the position of cam3 relative to cam2, (v) the position of cam1 relative to cam3, and (vi) the position of cam2 relative to cam3.

Figures 3A, 3B, 3C:
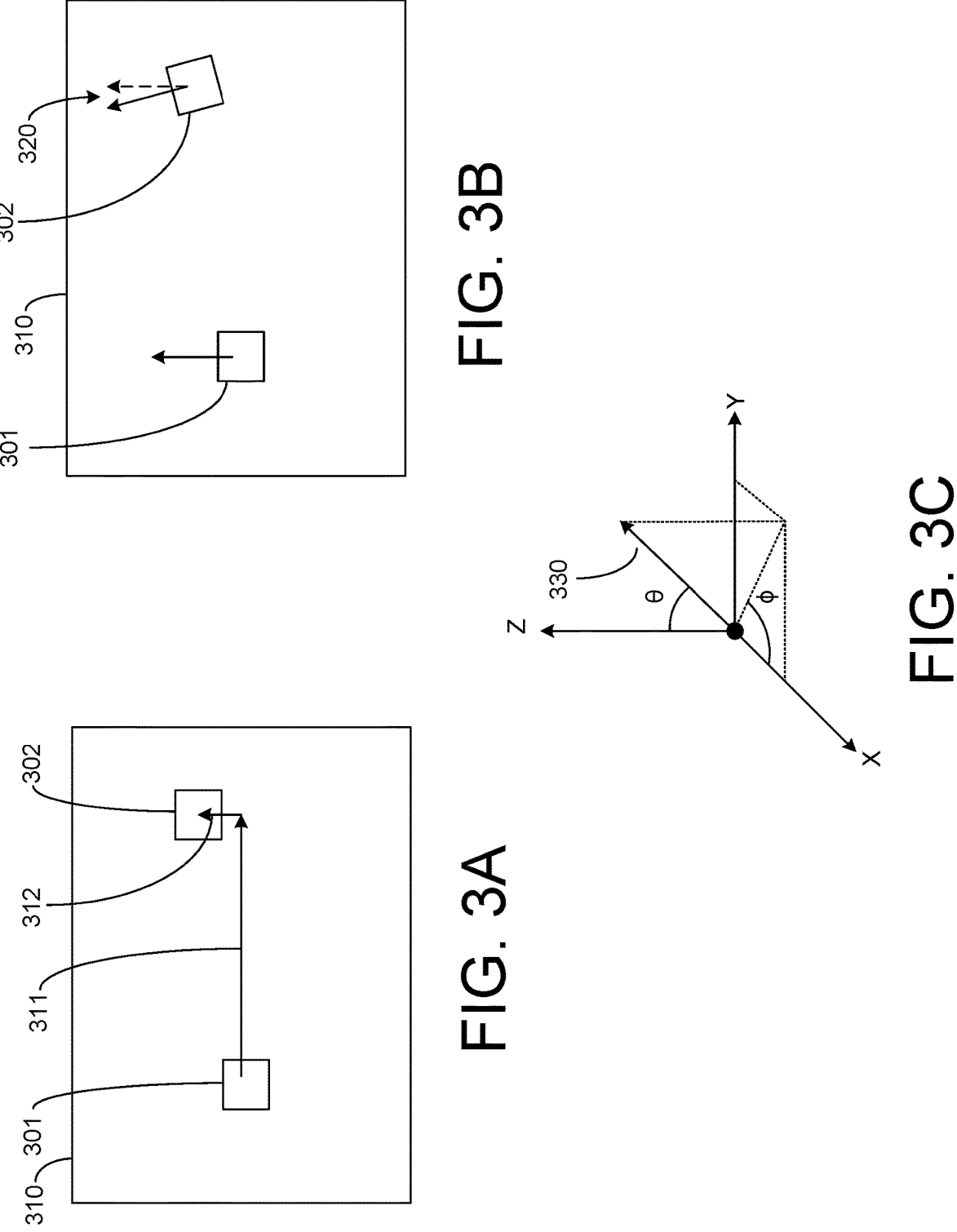
FIGS. 3A-3C illustrate relative cameras positions according to possible implementations of the present disclosure.

FIGS. 3A-3C illustrate relative cameras positions according to possible implementations of the present disclosure. A camera position can include any or all of the relative positions shown in these figures. The cameras may be coplanar in a plane 310 defined by the display and each camera (of a pair of cameras) may have an optical axis that points outward from the plane 310. The camera orientation is defined by its optical axis direction and this direction does not have to be orthogonal to the display. The relative positions of the cameras may be defined in terms of the plane 310 and the optical axes. For example, the relative position may include relative locations of the cameras in the plane 310 as a horizontal offset 311 and a vertical offset 312 between a first camera 301 (i.e., reference camera) and a second camera 302, as shown in FIG. 3A. The relative position may further include a relative rotation 320 of the cameras about their respective optical axis in the plane 310, as shown in FIG. 3B. The relative position may further include an angular difference (q, f) between the optical axis 330 of a camera relative to a reference coordinate system (X, Y, Z) based on the optical axis of the first camera (X-axis) and the plane (YZ plane).

The relative positions of multiple cameras may be calculated based on relative positions of pairs of cameras. For example, in the three-camera system described above, the position of cam2 relative to cam1 (i.e., cam2→cam1) and the position of cam3 relative to cam2 (i.e., cam3→cam2) may be sufficient to compute the position of cam3 relative to cam1 (i.e., cam3→cam2→cam1). Accordingly, a target for calibrating the relative positions of the cameras may not be visible to all cameras of a system. For example, in the three-camera system described thus far, a first target visible to cam1 and cam2 may be used to determine the position of cam2 relative to cam1 and a second target visible to cam2 and cam3 may be used to determine the position of cam3 relative to cam 2. It may be unnecessary to include a third target visible to both cam3 and cam1 because this relative position may be computed, as described above.

Figure 4A:
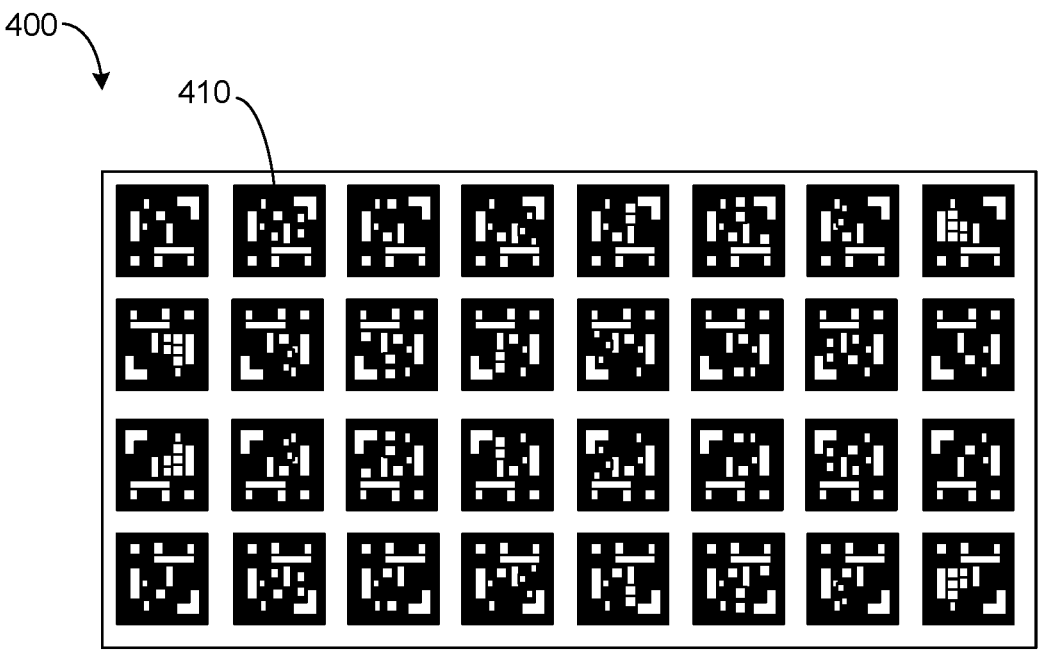
FIG. 4A illustrates a target according to a first possible implementation of the present disclosure.

FIG. 4A illustrates a target according to a first possible implementation of the present disclosure. The target 400 may include patterns (i.e., fiducials). A pattern may include one or more features (i.e., fiducials). As shown in FIG. 4A, a pattern 410 in the target 400 may include a 2D set of white and black squares of equal size. In this example implementation, each square is a feature and the 2D set of features is a pattern 410, with the target 400 including multiple patterns. The target can be mounted flat on a surface. Additional target implementations may be conceived to make the patterns/features of the target less obvious to an observer. In other words, a pattern of the target can obscure a purpose of the target (i.e., the target as a calibration reference) from the local user, which can help it blend into the environment of the telepresence system. In other words, a user may see the target but recognize it as a decoration or adornment.

Figure 4B:
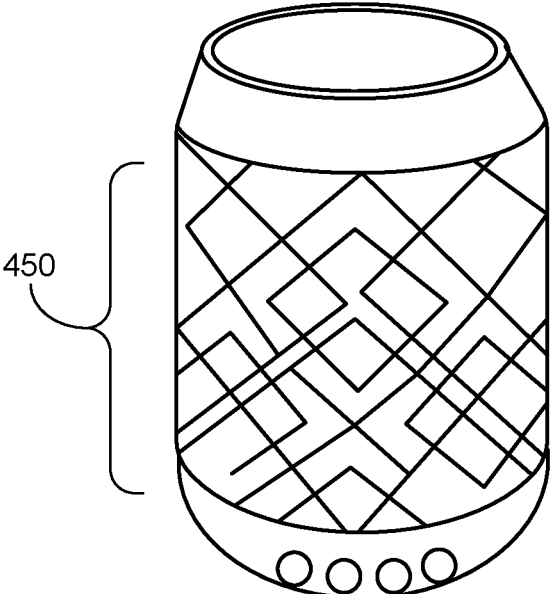
FIG. 4B illustrates a target according to a second possible implementation of the present disclosure.

FIG. 4B illustrates a target according to a second possible implementation of the present disclosure. As shown, the target 450 includes a pattern of interlocking squares. The interlocking squares may include features such as corners or lines, which can be located in images. The pattern of the second target implementation may be less likely to be recognized as a calibration target because of its regular (i.e., repeating) pattern and symmetry. Additionally, the pattern of the second target implementation may be less likely to be recognized as a calibration target because of its coloring, which may be coordinated with (e.g., matched to) a surface on which it is disposed. Additionally, the pattern of the second target implementation may be less likely to be recognized as a calibration target because of its shape, which may conform to a non-flat (e.g., cylindrical) surface on which it is disposed.

A target may be implemented as physical markings on a surface, which may be flat or otherwise. In another possible implementation, the target may be implemented as a mirror configured to reflect patterns/features from a display to one or more of the cameras. For example, a camera at a local station 101 of the telepresence system 100 may receive a reflection of a target presented on the local display 121 via a mirror. When the mirror is curved, the curvature of the mirror may be known so that distortions added to the reflected target by the mirror may be removed as part of the calibration process.

Figure 5:
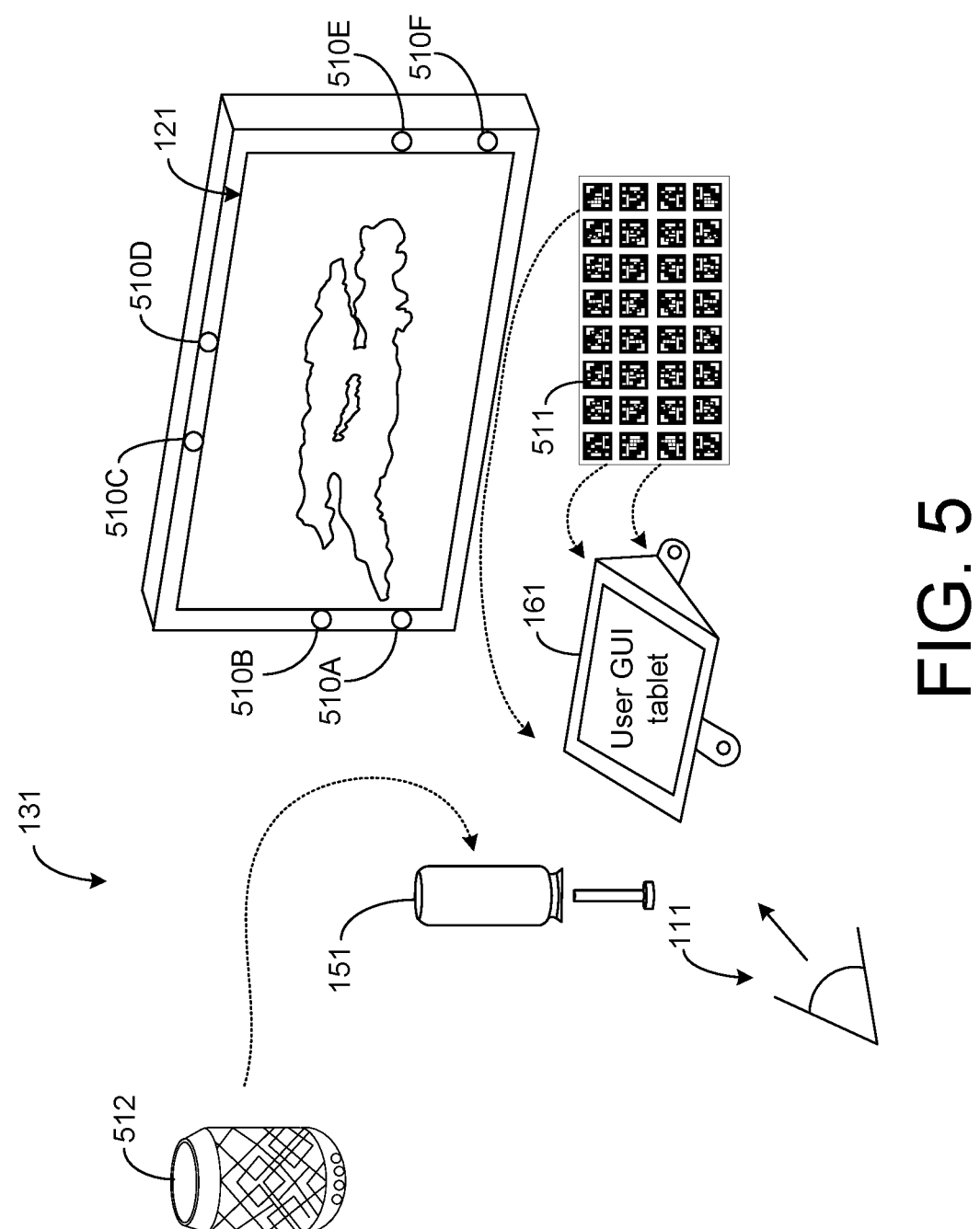
FIG. 5 illustrates the layout of a viewing area according to a possible implementation of the present disclosure.

FIG. 5 illustrates the layout of a viewing-area according to a possible implementation of the present disclosure. The viewing area (e.g., local viewing-area 131) may include a group (i.e., set) of targets that are positioned at fixed locations in the local viewing-area 131. Targets may be obscured from a view of a local user 111 in a few ways.

A target may be hidden (or otherwise obscured) from view of the user while being in view of one or more of the cameras. As shown, a first target 511 may be disposed on a surface (e.g., back surface) of an accessory (e.g., local equipment-mount 161) that faces a local set of cameras 510A-F and that faces away from the local user 111 so that the accessory (e.g., local equipment-mount 161) blocks the local user 111 from viewing the first target 511.

Additionally, or alternatively, a target may be essentially hidden (i.e., hidden in plain sight) by utilizing a pattern of features that appears esthetic. As shown, a second target 512 may disposed on a surface (e.g., back surface) of an accessory (e.g., local microphone 151) with a pattern that has a spatial frequency, aspect ratio, color, contrast, and/or symmetry that appears to be decorative so that when viewed by a user, the user is less likely notice the second target 512 than they would likely notice the first target 511.

Figure 6:
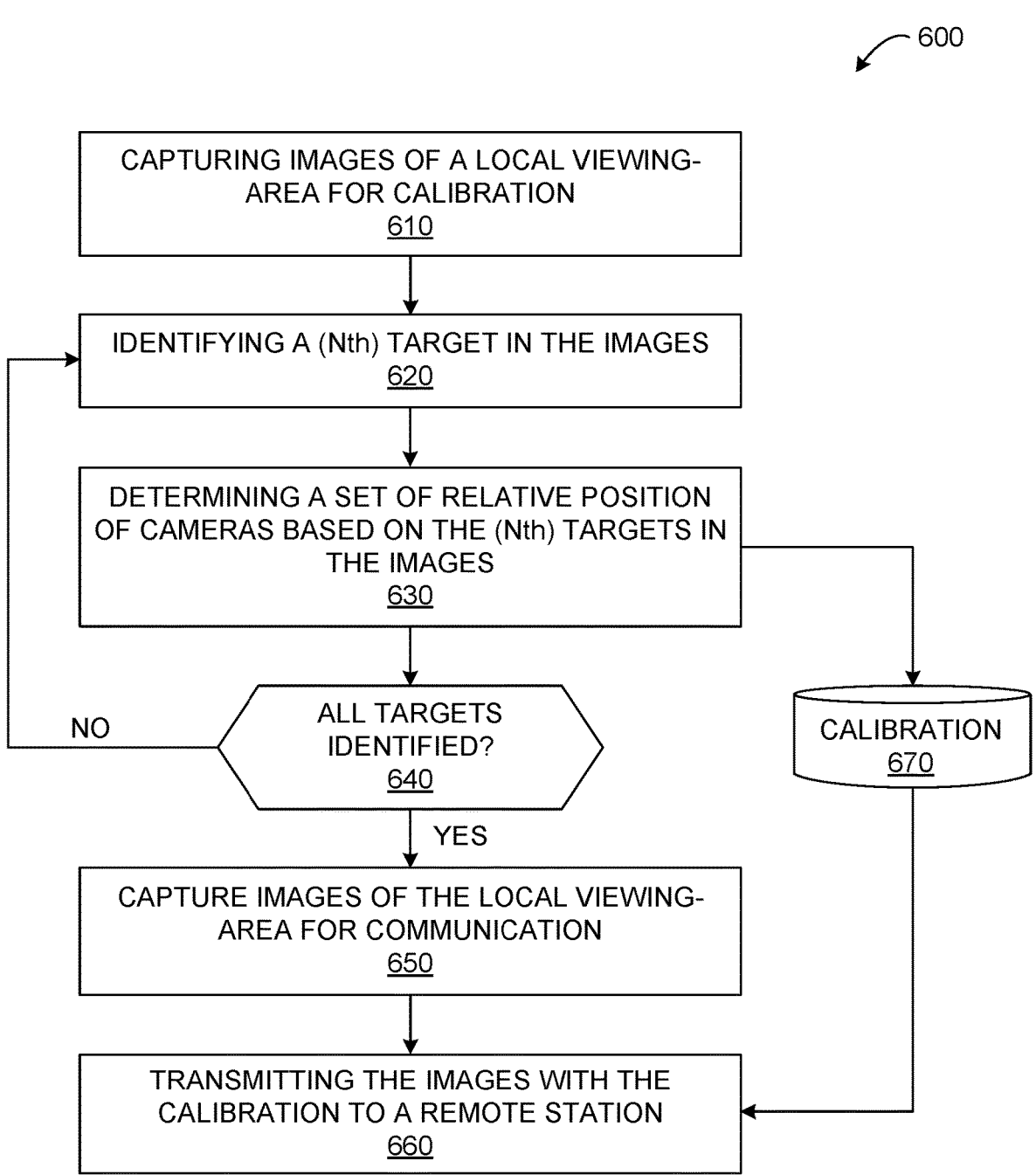
FIG. 6 is a flowchart of a method for calibrating cameras of a telepresence system according to a possible implementation of the present disclosure.

FIG. 6 is a flowchart of a method for calibrating cameras of a telepresence system according to a possible implementation of the present disclosure. The method may be performed periodically, on-demand, or as triggered by an event. For example, a temperature corresponding to the cameras (e.g., temperature change above a threshold) may trigger the method. The method may be performed online so that a user may still communicate while the method is being performed. The method may result in a calibration file. The calibration file may include the relative positions of the cameras. In a possible implementation, the calibration file may include a calibration corresponding to misalignments of the cameras. The misalignments may be relative to a set of target alignments (i.e., target positions). The target alignments may be relative positions of the cameras at a time of fabrication or install (i.e., factory-set camera positions).

The method may be implemented in digital electronic circuitry, or in computer hardware, firmware, software, or in a combination thereof. Implementations may be implemented as a computer program product (e.g., a computer program tangibly embodied in an information carrier, a machine-readable storage device (i.e., memory), a computer-readable medium, a tangible computer-readable medium), for processing by, or to control the operation of, data processing apparatus (e.g., a processor, a computer, or multiple computers). In some implementations, a tangible computer-readable storage medium may be configured to store instructions that when executed cause a processor to perform the method. A computer program, such as the computer program(s) described above, may be written in any form of programming language, including compiled or interpreted languages, and may be deployed in any form, including as a standalone program or as a module, component, subroutine, or other unit suitable for use in a computing environment. The computer program may be deployed to be processed on one computer or on multiple computers at one site or distributed across multiple sites and interconnected by a communication network.

The method 600 for calibrating cameras of a telepresence system includes capturing 610 images of a local viewing-area. The images are captured by a local set of cameras (i.e., cameras). The cameras can be mounted in a frame of a local display and the images from each camera can include one or more targets of a set of targets installed at fixed locations in the local viewing-area.

The method 600 further includes identifying 620 a first set of images captured by at least two cameras that include a first target. For example, a first target of the set of targets may be identified in a first image captured by a first camera and in a second image captured by a second camera. Based on the first set of images, a first set of relative positions of at least two cameras may be determined 630. For example, a position of the first camera relative to the second camera may be determined based on aspects (e.g., location, orientation, size, shape, etc.) of the first target in the first image compared to the aspects of the first target in the second image. All relative positions of all cameras having images that include the first target can be determined 630 using this same process. Each relative position result may be used to generate/update a calibration 670 for the local set of cameras. The method 600 may repeat 640 identifying targets and determining relative positions until all targets have been considered. In some cases, a relative position of a camera capture may be derived based on the relative position of other cameras in the set of local cameras. In a possible implementation, there may be an optional step in the method 600 after all targets have been considered that includes optimizing the camera positions and target localization. The global optimization can minimize errors in camera position (i.e., camera pose) based on all the cameras and their (transitive) relative positions (i.e., relative poses).

After the calibration is generated/updated 670 the method may further include capturing 650 images of the local viewing area. These images captured may be for rendering a 3D image. Accordingly, the images captured may be transmitted 660 with the calibration to a remote station. A remote processor at the remote station may be configured to render the 3D image by adjusting the images based on the calibration (e.g., calibration file) so that the perspectives of the images match a known set of perspectives for each camera. For example, an image from a misaligned camera may be adjusted so that it appears to have been taken from a camera aligned with a target perspective. In other words, the misalignment of a camera can be compensated for with the calibration, which can relax the amount of mechanical precision necessary for the camera alignment. After the images are adjusted, they may be combined for display as a 3D image on the remote display.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A telepresence system comprising:
a local display configured to present three-dimensional images to a local user in a local viewing-area;
a local set of cameras positioned relative to each other to capture images of the local viewing-area from multiple perspectives; and
a local processor communicatively coupled to the local display and the local set of cameras, the local processor configured by software instructions to perform a calibration process that includes:
determining a first set of relative positions of a first pair of cameras of the local set of cameras based on a target visible in a first set of images captured by the first pair of cameras;
determining a second set of relative positions of a second pair of cameras of the local set of cameras based on the target visible in a second set of images captured by the second pair of cameras;

determining a third set of relative positions of a third pair of cameras of the local set of cameras based on the first set of relative positions and the second set of relative positions; and
generating, or updating, a calibration for the local set of cameras to support rendering of stereoscopic three-dimensional images based on the first set of relative positions, the second set of relative positions, and the third set of relative positions, the calibration corresponding to misalignments of the local set of cameras from a set of target alignments.

2. The telepresence system according to claim 1, the target is on an accessory that is in a fixed location in the local viewing-area, the target facing the local set of cameras and facing away from the local user so that the accessory blocks the local user from viewing the target.

3. The telepresence system according to claim 1, wherein:
the telepresence system is configured to provide communication between the local user and a remote user; and
the calibration process occurs online without interrupting the communication between the local user and the remote user.

4. The telepresence system according to claim 1, wherein the calibration process is triggered by a temperature corresponding to the local set of cameras.

5. The telepresence system according to claim 1, wherein the target is on a speaker that is fastened to a desk surface of a desk in the local viewing-area, the target facing the local set of cameras and facing away from the local user so that the speaker blocks the local user from viewing the target.

6. The telepresence system according to claim 1, wherein the target is on a microphone that is fastened to a desk surface of a desk in the local viewing-area, the target facing the local set of cameras and facing away from the local user so that the microphone blocks the local user from viewing the target.

7. The telepresence system according to claim 1, wherein the target is on an equipment-mount fastened to a desk surface of a desk in the local viewing-area, the target facing the local set of cameras and facing away from the local user so that the equipment-mount blocks the local user from viewing the target.

8. The telepresence system according to claim 1, wherein the target is a mirror configured to reflect a pattern presented on the local display to the local set of cameras, the mirror facing away from the local user.

9. The telepresence system according to claim 1, wherein the target is not viewable by the third pair of cameras of the local set of cameras.

10. The telepresence system according to claim 1, wherein the target is located on a wall of the local viewing-area, the wall being behind the local user and facing the local set of cameras.

11. The telepresence system according to claim 10, wherein the target includes a pattern that obscures a purpose of the target from the local user.

12. The telepresence system according to claim 1, wherein the local set of cameras are mounted in a frame surrounding the local display.

13. The telepresence system according to claim 12, wherein the local set of cameras include:
the first pair of cameras of the local set of cameras that are positioned in a top portion of the frame above the local display;
the second pair of cameras of the local set of cameras that are positioned in a left portion the frame; and the third pair of cameras of the local set of cameras that are positioned in a right portion the frame.

14. A method for calibrating cameras of a telepresence system, the method comprising:

capturing images of a set of targets using a local set of cameras mounted in a frame of a local display, each target of the set of targets at fixed locations in a local viewing-area;

identifying a first set of images captured by a first pair of cameras of the local set of cameras that include a first target of the set of targets;

determine a first set of relative positions of the first pair of cameras based on the first target in the first set of images;

identifying a second set of images captured by a second pair of cameras of the local set of cameras that include a second target of the set of targets;

determine a second set of relative positions of the second pair of cameras based on the second target in the second set of images; transitively computing a third set of relative positions of a third pair of cameras based on the first set of relative positions and the second set of relative positions; and generating, or updating, a calibration to support rendering of stereoscopic three-dimensional images based on the first set of relative positions, the second set of relative positions, and the third set of relative positions, the calibration corresponding to misalignments of the local set of cameras from a set of target alignments.

15. The method for calibrating the cameras of the telepresence system according to claim 14, wherein:

the first target is located on a surface of an accessory that faces the local set of cameras and that faces away from a local user in the local viewing-area so that the accessory blocks the local user from viewing the first target; and the second target is located on a wall of the local viewing-area, the wall behind the local user and facing the local set of cameras.

16. The method for calibrating the cameras of the telepresence system according to claim 15, wherein the first target or the second target includes a pattern that obscures a purpose of the first target or the second target from the local user.

17. The method for calibrating the cameras of the telepresence system according to claim 14, wherein the first target or the second target includes a mirror configured to reflect a pattern displayed on the local display to the local set of cameras.

18. A telepresence system comprising:

a local viewing-area including:

a local set of cameras positioned relative to each other to capture images of the local viewing-area from multiple perspectives;

a target fixedly disposed on a surface of the local viewing-area; and a local processor communicatively coupled to the local set of cameras, the local processor configured by local software instructions to perform a calibration process that includes:

capturing images of the target from at least two cameras of the local set of cameras;

determining based on the images of the target, relative positions between the at least two cameras; and generating, or updating, a calibration file based on the relative positions; and a remote viewing-area including:

a remote display configured to present three-dimensional images; and a remote processor communicatively coupled to the local processor and the remote display, the remote processor configured by remote software instructions to perform a three-dimensional image rendering process that includes:

receiving images captured by the local set of cameras and the calibration file generated by the local processor;

generating adjusted images based on the calibration file, the adjusted images including corrected perspectives of the local viewing-area that compensate for misalignments of the local set of cameras; and combining the adjusted images for display as the three-dimensional images on the remote display.

19. The telepresence system according to claim 18, wherein:

the target is hidden from view of a local user in the local viewing-area and/or includes a pattern that obscures a purpose the target from the local user.

* * * * *